United States Patent [19]

Hayes et al.

[11] 3,874,699
[45] Apr. 1, 1975

[54] DEVICES FOR INHIBITING THE JACK-KNIFING OR ARTICULATED VEHICLES

[75] Inventors: Philip Hayes; William O'Leary, both of Innishannon, Ireland

[73] Assignee: Artiloc U.S.A. Inc., San Francisco, Calif.

[22] Filed: Feb. 10, 1972

[21] Appl. No.: 225,325

Related U.S. Application Data

[63] Continuation of Ser. No. 878,601, Nov. 21, 1969.

[30] Foreign Application Priority Data

Nov. 23, 1968 United Kingdom........... 55650/68

[52] U.S. Cl. ............................. 280/432, 280/446 B
[51] Int. Cl. ............................................ B62d 53/10
[58] Field of Search ................................... 280/432

[56] References Cited
UNITED STATES PATENTS

| | | | |
|---|---|---|---|
| 3,063,739 | 11/1962 | Davies | 280/438 |
| 3,328,051 | 6/1967 | Hope et al. | 280/432 |

*Primary Examiner*—Leo Friaglia
*Attorney, Agent, or Firm*—Edward F. Connors

[57] ABSTRACT

An anti jack-knifing coupling is arranged between a vehicle and a trailer and comprises a turntable mounted on the vehicle for rotation about a vertical axis. A brake disc is secured to the turntable and brake calipers are used to prevent rotation of the turntable while the vehicle is being braked. The coupling between the vehicle and trailer is arranged so that relative articulation can only occur when the brake calipers are inoperative.

9 Claims, 7 Drawing Figures

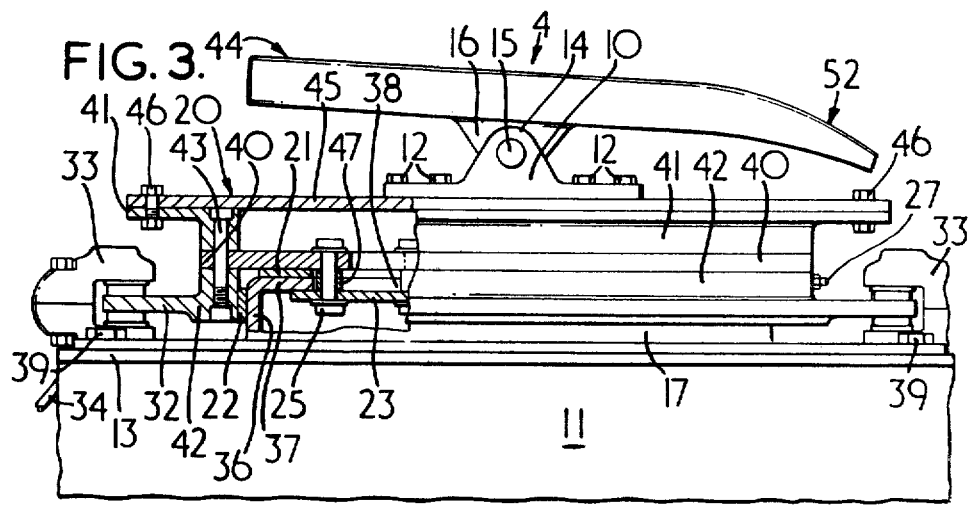
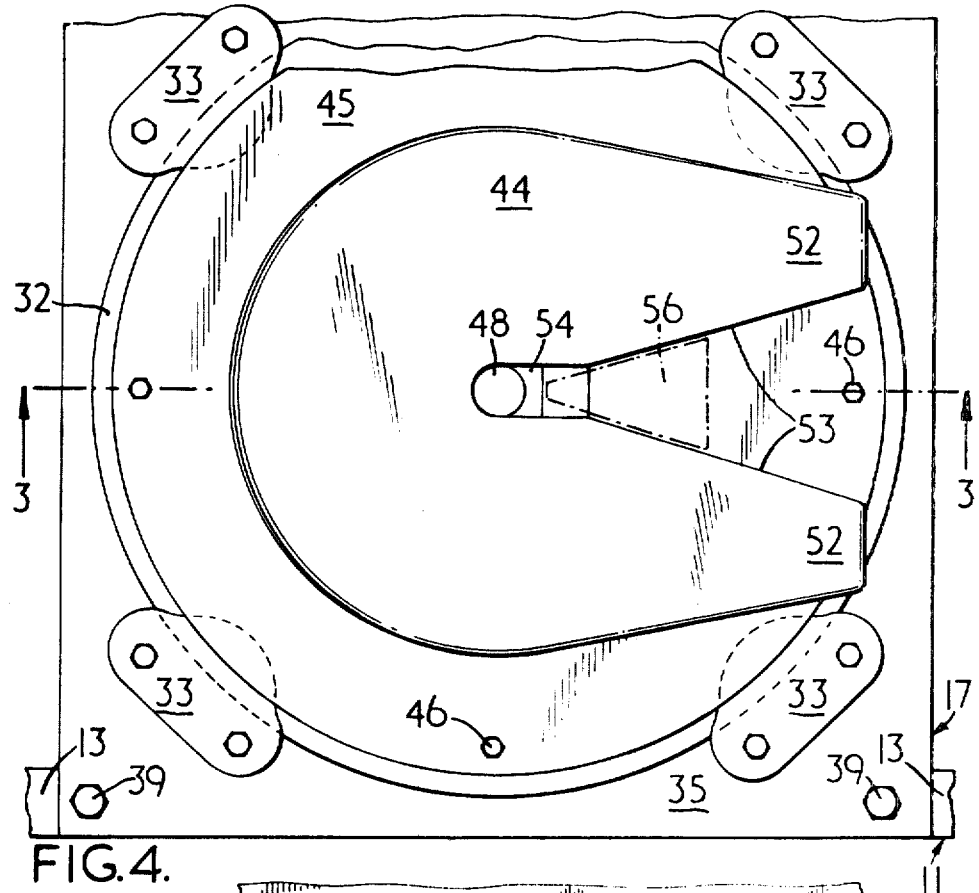
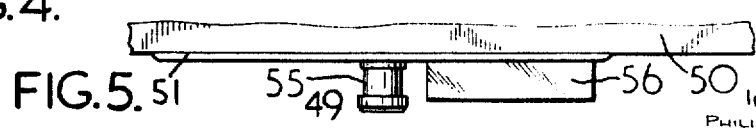

INVENTORS.
PHILIP HAYES &
WILLIAM O'LEARY

BY

ATTORNEY

DEVICES FOR INHIBITING THE JACK-KNIFING OR ARTICULATED VEHICLES

This is a continuation of application Ser. No. 878,601, filed Nov. 21, 1969.

The invention is concerned with improvements in or relating to the prevention of jack-knifing in articulated vehicles. Articulated vehicles essentially comprise a load-carrying trailer attached to a tractor portion by a device which is known as a fifth wheel coupling. The tractor portion conventionally comprises a chassis supported by at least two pairs of coaxial wheels, of which one pair are driven from a prime mover through a conventional automotive transmission, and the other coaxial pair are steerable from a driver's cab supported by the chassis. Vehicles of this category are particularly useful in that a single tractor portion can be utilised to transport a series of different trailer portions thereby saving the turnaround time which would otherwise be spent in loading and unloading the trailer portion.

While articulated vehicles have well recognised merits, they have one common draw-back in that the trailer portion is inclined to "jack-knife" during heavy deceleration, or on slippery surfaces. Jack-knifing occurs whenever the rear road wheels of the tractor portion are locked and skid in a direction transverse to the direction of travel so that the whole trailer portion swings about the fifth wheel coupling and tends to overtake the tractor portion. Jack-knifing can occur to such an extent that the trailer portion presses against the side of the tractor portion and pulls it around so that the complete articulated vehicle starts to spin in the fully articulated position. There are two distinct types of jack-knifing condition. In one type the front wheels of the tractor portion also lock and skid, and the whole vehicle tends to skid in a straight line provided the types of the tractor portion have similar frictional coefficients with the road, but as the speed drops, any slight lack of balance between the frictional coefficients becomes more noticeable and the tractor portion will swing comparatively slowly but uncontrollably into the fully jack-knifed positions. With the second and most dangerous type, the front wheels of the tractor portion do not skid and the slightest side force applied to the tractor rear wheels, which have been locked by a brake application, will suddenly cause a vicious jack-knifing condition. This particular type of instability is extremely difficult if not impossible to control and is the cause of a large number of fatal accidents due to the manner in which the trailer portion can sweep across the path of oncoming traffic. Another extremely dangerous condition known as 'trailer swing' occurs when the trailer wheels lock and the trailer swings sideways about the fifth wheel coupling thereby obstructing either the pavement or another carriageway of the road.

Various proposals have already been made for inhibiting or controlling the jack-knifing action of articulated vehicles and some of these systems have proved to be acceptable in use. However, most of the proposals are rather complex in nature and are essentially costly. The words "articulated vehicle" are used to embrace any combination of a wheeled vehicle towing a trailer and in particular include the articulated combination of an automobile with a caravan or other trailer.

An object of this invention is to provide an anti jack-knifing device which is both simple in concept and efficient in use.

According to the invention an anti jack-knifing device, for coupling a wheeled vehicle to tow an articulated trailer, includes a turntable supported for rotation about a substantially vertical axis from a support means to be secured to the rear of said wheeled vehicle for the vertical axis to lie on the longitudinal centre line of the wheeled vehicle, a releasable coupling means held rotatively fast with the turntable and being for connection to the articulated trailer whereby articulation of the trailer will cause corresponding rotation of the turntable about its said vertical axis, an annular brake surface defined by said turntable, said annular brake surface lying wholly in a plane normal to said vertical axis, and brake means operable for engaging said annular brake surface to inhibit rotation of the turntable during deceleration of the vehicle. The annular brake surface may be defined by a brake disc coaxially fast with the turntable. Preferably said brake disc defines a second annular brake surface also lying wholly in a plane normal to said vertical axis, and said brake means includes at least one pair of calipers for gripping said annular brake surfaces.

Preferably a transversely directed horizontal pivot is arranged to be substantially parallel with the axis of an axle of the articulated trailer whereby the rear of the trailer can move upwards and downwards about a small arc. If desired, stops can be provided for limiting the movement about the transverse pivot. The turntable may be supported for rotation about a bearing member that is arranged to be connected to the rear of the wheeled vehicle by said transversely directed horizontal pivot, and said brake means is carried by said bearing member. Alternatively, the turntable may be supported for rotation about a bearing member that is arranged to be secured to the rear of the wheeled vehicle together with said brake means, and the releasable coupling means is supported from the turntable by said transversely directed horizontal pivot. In the case where the releasable coupling means is a fifth wheel coupling for engaging a vertically-directed king pin secured to the trailer, means are provided for locking the king pin against rotation in the fifth wheel coupling whereby articulation of the trailer will take place about the vertical axis of the turntable. Preferably the means for locking the king pin against rotation is additionally arranged to allow very limited articulation of the trailer about its king pin after the turntable has been locked by said brake means so that the trailer can be articulated through small angles during deceleration. In this manner downgrade manoeuverability is achieved. Alternatively, the releasable coupling means may include a transversely directed horizontal pin which constitutes said transversely directed horizontal pivot and is for connection to a complementary coupling secured to the articulated trailer.

Preferably, the turntable includes a radial flange which rests on a complementary horizontal thrust surface defined by a bearing member which is to be secured to the rear of the wheeled vehicle. The horizontal thrust surface may be defined by an annular radial flange of the bearing member, and an annular retaining ring is arranged to bear against the underside of the bearing member flange and is secured to the turntable. The radial flange of the turntable may be fast with a drum defining an inwardly facing cylindrical surface which bears against a journal bearing defined by an outwardly facing cylindrical surface of the bearing member. Preferably the brake means are arranged to be operated by the braking system of the vehicle whereby rotation of the turntable will be inhibited whenever the vehicle is being decelerated by its brakes. Preferably, the means for locking the king pin against rotation is a V-shaped wedge member secured to the trailer for engagement in the complementary V-notch defined by the fifth wheel plate. In this case, limited articulation of the trailer about the king pin may be achieved by arranging a corresponding slight clearance between the V-shaped wedge and the V-notch.

The invention is now described, by way of example only, with reference to the accompanying drawing, in which:

FIG. 3 is a partial longitudinal section of another embodiment taken on the line 3—3 of FIG. 4;

FIG. 4 is a plan view of FIG. 3 taken in the direction of arrow 4;

FIG. 5 is a scrap elevation of part of a trailer showing the modified coupling for use with the embodiment shown in FIGS. 3 and 4;

Figure 1:
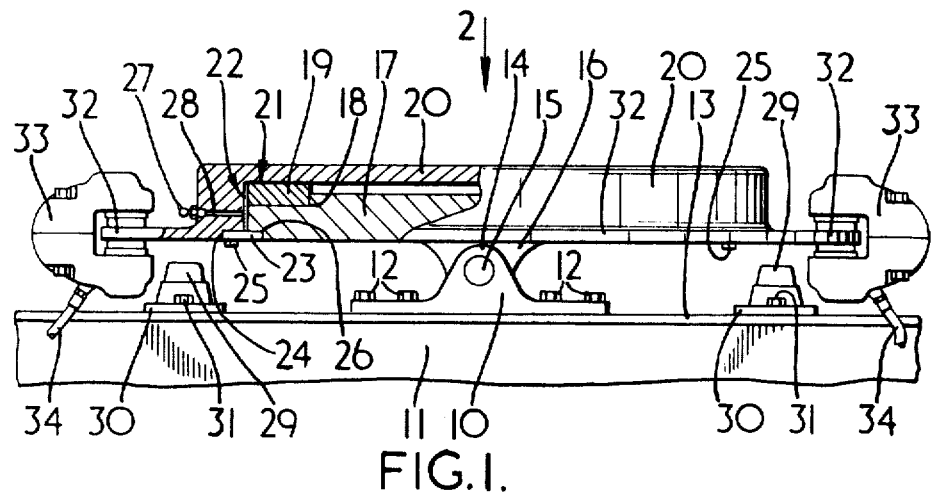
FIG. 1 is a partial longitudinal section of one embodiment taken on the line 1—1 of FIG. 2, the trailer coupling being omitted.
Figure 2:
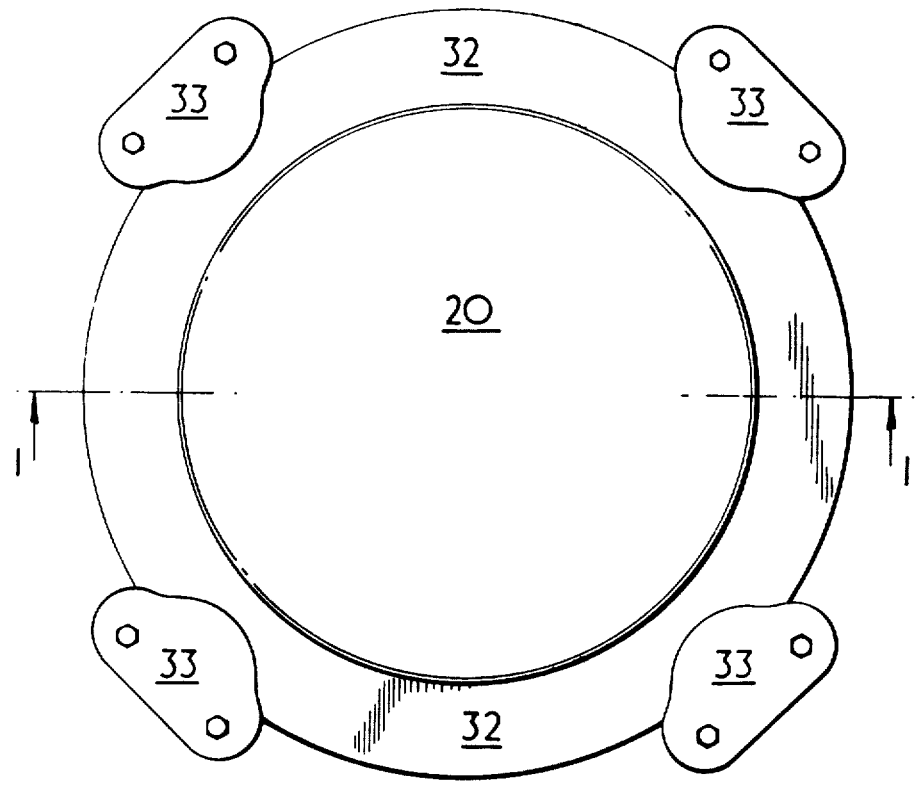
FIG. 2 is a plan view of FIG. 1 taken in the direction of arrow 2.

With reference to FIGS. 1 and 2, an anti jack-knifing device comprises a pedestal 10 secured to the fore and aft chassis members 11 of a wheeled vehicle constituting the tractor portion of an articulated vehicle. The pedestal is secured to the chassis members 11 by a number of bolts 12 which extend through a top flange 13 of the chassis members to coact with respect unshown nuts. The pedestal 10 defines a pair of upstanding bifurcated lugs 14, of which only one is seen in FIG. 1, and the lugs 14 support a transversely directed horizontal pivot pin 15 which passes through a depending boss 16 formed integral with a circular support plate 17.

The support plate 17 has an annular groove 18 formed in its upper surface to locate an annular bronze thrust ring 19 which is arranged so that its central axis passes through the centre of the transverse pivot 15. A generally flat circular turntable 20 is supported by the bronze thrust ring for rotational movement about its vertical axis, vertical loads being transmitted by the annular radial upper surface 21 of the thrust ring 19, and transverse loads being transmitted to the cylindrical surface 22 of the thrust ring 19. A retaining ring 23 is located in an annular recess 24 formed in the bottom of the turntable 20 and is secured to the latter by an annular array of bolts 25. The radially inner portion of the retaining ring 23 is a working fit in a corresponding annular groove 26 formed in the bottom surface of the supporting plate 17 and accordingly retains the turntable 20 in position. The space between the support plate 17 and the turntable 20 is filled with grease for lubrication purposes through a grease nipple 27 and a communicating grease passage 28.

The upper flat surface of the turntable 20 is provided with any suitable securing means for attachment to any type of fifth wheel coupling for a trailer - for instance the fifth wheel coupling shown in FIGS. 3 to 5. However, it should be noted that the fifth wheel coupling would be non-conventional in that it must not allow articulation of the trailer about the king pin or other vertical coupling axis. In this manner the fifth wheel coupling prevents the trailer from moving relatively to the turntable 20, and accordingly all movements of the trailer portion relative to the tractor portion will be accompanied by relative rotation between the turntable 20 and the support plate 17. Whenever an articulated vehicle traverses over a portion of road having a varying gradient, the back wheels of the trailer must essentially rise or fall appropriately, and this movement is accommodated by the transverse pivot 15 which allows the turntable 20 and the support plate 17 to rock about the transverse axis of pivot 15 relatively to the chassis frame 11 of the tractor portion. This rocking movement is limited by a pair of rubber buffers 29 secured by mounting plates 30 and bolts 31 to the top flange 13 of the tractor chassis frame members 11.

A braking disc 32 is formed integral with the turntable 20 and passes between four brake calipers 33 which are equi-spaced about the turntable as indicated in FIG. 2. These brake calipers are of any convenient type such as those commonly used for the disc brakes of vehicle wheels, and are connected by respective brake hoses 34 to the fluid operated brake system of the tractor portion.

Alternatively, the four brake calipers 33 can be connected by their hoses to an independent fluid system operated by a servo cylinder actuated by the braking system of the tractor portion. This is particularly convenient when the tractor portion has a pneumatic braking system and the brake calipers 33 are to be operated by brake fluid. Desirably alternate pairs of the calipers 33 are connected to separate fluid circuits to minimise the risk of failure.

It will therefore be appreciated that, whenever the wheels of the tractor portion are braked, the brake calipers 33 will grip the disc 32 and prevent articulation of the trailer. The degree of braking torque applied to the brake disc 32 will depend upon the braking force applied to the wheels of the tractor portion and thus to the deceleration of the entire vehicle. Accordingly it will be seen that the force applied by the brake calipers 33 to maintain the articulated portion in its proper position will increase progressively with the deceleration of the articulated vehicle and with the transverse forces generated on the trailer portion which would otherwise cause a dangerous jack-knifing condition. If desired, valve means could be arranged between the brake hoses 34 and the vehicle braking system whereby the calipers 33 would only become operative after a predetermined pressure has been achieved in the vehicle braking system. This predetermined pressure could be arranged such that the brake calipers 33 will only become operative just before the deceleration of the vehicle reaches the point where a jack-knifing condition might be imminent. In this manner, the trailer portion would remain manoeuverable about the articulation axis provided by the turntable 20 and the transverse pivot 15 during ordinary deceleration, but would become locked to the tractor portion immediately prior to the initiation of a jack-knifing condition.

It should be noted that the brake calipers 33 must rise and fall with the brake disc 32 about the transverse axis 15, and this can conveniently be achieved by attaching the brake calipers 33 to the support plate 17 by means of a suitable unshown spider bolted to support plate 17.

The brake hoses 34 may, if desired, be connected directly to the brake system so that the brake disc 32 will be inhibited from rotation about the support plate 17 whenever the brakes of the tractor portion are applied.

If desired, the brake hoses 34 can be supplied with brake fluid by means of a separate master cylinder operated by the main brake pedal.

In order to cater for down-grade manoeuverability whilst the tractor portion is being braked, the fifth wheel coupling can be arranged to permit a small degree of swinging movement between the trailer portion and the turntable 20 as will be described later with reference to FIGS. 3 to 5.

The embodiment illustrated in FIGS. 3 to 5 will now be described and it should be noted that a number of the components are similar to those already described with reference to FIGS. 1 and 2 - accordingly, the same reference numerals have been used to denote equivalent components and only the points of difference will be described in detail. The circular support plate 17 is now formed as a pressing from heavy gauge mild steel and comprises a rim 35 which is rectangular in plan, a cylindrical portion 36 and an annular radial portion 37 formed with a central hole 38. The rim 35 is secured by bolts 39 direct to the fore and aft chassis members 11 so that the upstanding cylindrical boss defined by the cylindrical and radial portions 36 and 37 is secured rigidly to the tractor portion.

The turntable 20 is now formed as a composite assembly including an annular radial plate 40 sandwiched between a top flanged casting 41 and a bottom flanged casting 42 which are secured together by a series of countersunk through bolts 43. The top flanged casting 41 is useful in that its radial flange can be adapted as a mounting point for any type of trailer coupling. The bottom flanged casting 42 has its radial flange machined to form the braking disc 32. The annular bronze thrust ring 19 illustrated in FIGS. 1 and 2 has been split into two separate portions 21 and 22 which serve the same functions as previously and are conveniently secured to the support plate 17.

The greatest functional change is that the pedestal 10 and the pivot pin 15 have been repositioned between the turntable 20 and the coupling 44 which is a conventional fifth wheel plate. The depending boss 16 is secured to the fifth wheel plate 44, and the pedestal 10 is secured by its bolts 12 to a circular adaptor plate 45 which is connected to the flange of the top flanged casting 41 by nuts and bolts 46 as shown. With this construction the brake calipers 33 are conveniently bolted directly to the rim 35 of the support plate 17. The retaining ring 23 is still required and is arranged inside the cylindrical portion 36 to bear on the underside of the annular radial portion 37, the retaining ring 23 being secured to the annular radial plate 40 by the bolts 25 which extend through the central hole 38. Spacers 47 are arranged over the bolts 25 to ensure the desired working clearances between the turntable 20, the upper bearing surface 21 and the retaining ring 23. This embodiment has the advantage that the calipers 33 are secured by the rim 35 directly to the chassis members 11 and that any type of coupling can be secured to the top flanged casting 41. If desired the top flanged casting could be formed as an integral part of the pedestal 10 or complementary part of any type of coupling.

The fifth wheel coupling 44 is provided with the conventional socket 48 for receiving the trailer king pin 49 which is secured to the front of the articulated trailer portion 50 through a wear plate 51. A pair of ramps 52 at the rear of the fifth wheel coupling 44 coact with the wear plate 51 and serve to transfer the weight of the front end of the trailer onto the rear of the tractor. The ramps 52 have inclined inner walls defining a V-notch 53 which serves to guide the king pin 49 into its socket 48 where it is locked into position by a latch 54 engaging a reduced diameter portion 55. However, if the fifth wheel coupling is allowed to operate in its usual fashion articulation will occur about the king pin 49 instead of the turntable 20. This is prevented by means of a V-shaped wedge 56 secured to the wear plate 51 for engagement with the walls of the V-notch 53. Desirably, the angle of the V-shaped wedge 56 is slightly less than the angle of the V-notch 53 thereby allowing limited articulation of the trailer about the king pin 49 after the turntable 20 has been locked by the calipers 33 so that the trailer can be articulated through small angles during deceleration.

Figure 6:
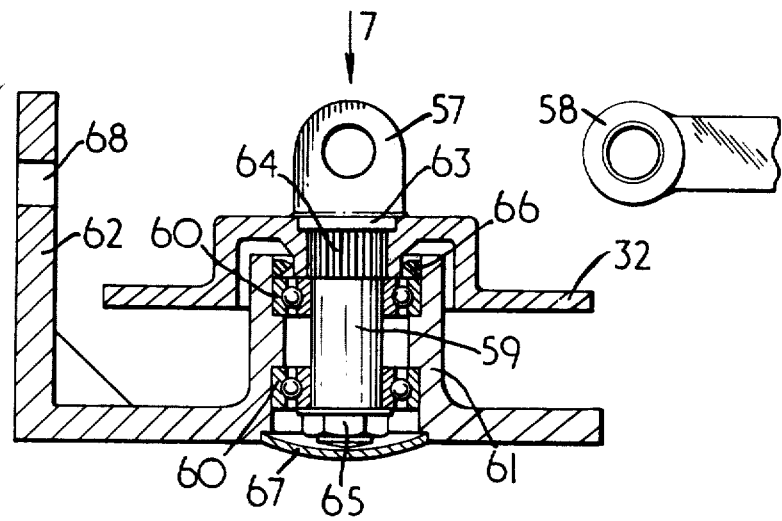
FIG. 6 is a longitudinal section of a further embodiment taken on the line 6—6 of FIG. 7.
Figure 7:
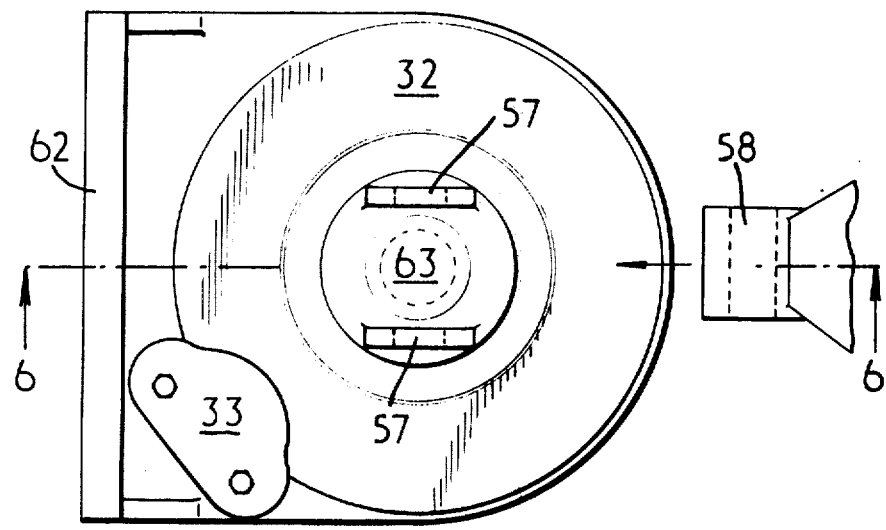
FIG. 7 is a plan view of FIG. 6 taken in the direction of arrow 7.

The embodiments described with reference to FIGS. 1 to 5 are particularly suitable for use with articulated vehicles. However, the embodiment now described with reference to FIGS. 6 and 7 is designed for use with other trailers such as caravans and trailers to be drawn with cars. Nevertheless, the principles of construction could be applied to articulated vehicles if desired thereby eliminating the standard type of fifth wheel coupling.

With reference to FIGS. 6 and 7, a braking disc 32 is formed integral with a pair of horizontally aligned lugs 57 which can be connected by an unshown pin to a corresponding trailer hitch 58. The braking disc 32 is connected by a vertical pin 59 for pivoting in a pair of opposed combined journal and thrust bearings 60 located in a boss 61 formed integral with a mounting bracket 62. The vertical pin 59 is provided with a head 63 engaging the top of the braking disc 32 and a splined portion 64 ensures that the pin 59 rotates with the braking disc 32. A nut 65 engages a threaded portion at the base of the pin 59 to load the bearings 60, the assembly being sealed against dust and water by a seal 66 and a welch plug 67. The mounting bracket 62 is conveniently connected to the car or tractor portion by means of unshown bolts extending through bores 68. A single brake caliper is conveniently bolted to the mounting plate 62. This simple embodiment has the advantage that the coupling 57, 58 inherently allows the trailer to rise and fall and the problems associated with the use of a king pin and fifth wheel coupling are avoided.

What we claim as our invention and desire to secure by letters patent of the United States is:

1. An anti jack-knifing device coupling a wheeled vehicle to tow an articulated trailer, comprising a support means secured to the rear of the vehicle, a turntable supported from said support means for rotation about a substantially vertical axis intersecting the longitudinal center line of the vehicle, a releasable coupling means secured to the turntable for rotation therewith, said releasable coupling means being connected to the trailer whereby articulation of the trailer will cause corresponding rotation of the turntable about its said vertical axis, wherein the improvement comprises an annular brake surface defined by said turntable, said annular brake surface lying wholly in a plane normal to said vertical axis, and brake means operable to engage said annular brake surface to inhibit rotation of the turntable during deceleration of the vehicle, said releasable coupling means comprising a fifth wheel coupling, a vertically-directed king pin carried by the front underside of the trailer for engagement by the fifth wheel coupling, and locking means for interengaging the trailer and the fifth wheel coupling whenever the articulation of the trailer exceeds a very small angle in either direction, whereby the trailer is allowed very limited articulation about its king pin and greater angles of articulation can only take place about said vertical turntable axis.

2. An anti jack-knifting device as in claim 1 wherein said fifth wheel coupling defines a V-notch for guiding the king pin into engagement with the fifth wheel coupling, and said locking means is a V-shaped wedge secured to the trailer behind the king pin, the angle of the V-shaped wedge being slightly less than the angle of the V-notch, and the V-shaped wedge being positioned for its apex to be substantially coincident with the apex of the V-notch when the king pin is in position in said fifth wheel coupling.

3. An anti jack-knifing device coupling a wheeled vehicle to tow an articulated trailer, comprising a support means secured to the rear of the vehicle, a turntable supported from said support means for rotation about a substantially vertical axis intersecting the longitudinal center line of the vehicle, a releasable coupling means secured to the turntable for rotation therewith, said releasable coupling means being connected to the trailer whereby articulation of the trailer will cause corresponding rotation of the turntable about its said vertical axis, wherein the improvement comprises an annular brake surface defined by said turntable, said annular brake surface lying wholly in a plane normal to said vertical axis, and brake means operable to engage said annular brake surface to inhibit rotation of the turntable during deceleration of the vehicle, a radial flange secured to said turntable, said support means defining a horizontal thrust surface complementary to the radial flange, said turntable being supported from said support means by the radial flange resting on the horizontal thrust surface, a horizontal annular radial flange forming a portion of said support means, the horizontal thrust surface being defined by the top surface of said horizontal annular radial flange, the bottom surface of the horizontal annular radial flange defining a second horizontal bearing surface, an annular retaining ring arranged to bear against said second horizontal bearing surface, and securing means interconnecting the turntable and the annular retaining ring.

4. An anti jack-knifting device coupling a wheeled vehicle to tow an articulated trailer, comprising a support means secured to the rear of the vehicle, a turntable supported from said support means for rotation about a substantially vertical axis intersecting the longitudinal center line of the vehicle, a releasable coupling means secured to the turntable for rotation therewith, said releasable coupling means being connected to the trailer whereby articulation of the trailer will cause corresponding rotation of the turntable about its said vertical axis, wherein the improvement comprises an annular brake surface defined by said turntable, said annular brake surface lying wholly in a plane normal to said vertical axis, and brake means operable to engage said annular brake surface to inhibit rotation of the turntable during deceleration of the vehicle, a radial flange secured to said turntable, said support means defining a horizontal thrust surface complementary to the radial flange, said turntable being supported from said support means by the redial flange resting on the horizontal thrust surface, and said radial turntable flange being secured to a drum defining an inwardly facing cylindrical surface, said support means defining an outwardly facing cylindrical surface constituting a journal bearing and said inwardly facing cylindrical surface bearing against said journal bearing.

5. An anti jack-knifting device as in claim 3, in which the radial turntable flange is secured to a drum defining an inwardly facing cylindrical surface, said support means defining an outwardly facing cylindrical surface constituting a journal bearing, and said inwardly facing cylindrical surface bearing against said journal bearing.

6. The device of claim 1 wherein said brake surface includes a brake member fast with said turntable and defining a pair of parallelly-spaced opposed horizontal brake surfaces and said brake means includes at least one brake calliper mounted from the tractor to be restrained from movement about said vertical axis of the turntable and positioned for operative engagement with said brake surfaces at all articulated positions of the trailer relative to the tractor, whereby upon actuation of said brake calliper articulation of the trailer relative to the tractor is resisted.

7. A coupling means for connecting a tractor vehicle to an articulated trailer so as to prevent jack-knifing of the trailer comprising,
   a. support means secured to the rear of the tractor vehicle;
   b. a cylindrical bearing support upstanding from the support means;
   c. bearing means mounted on the bearing support;
   d. a turntable supported by the support means for rotation about a substantially vertical axis intersecting the longitudinal center line of the vehicle and rotatably mounted on the bearing means and radially and horizontally supported thereby for rotation;
   e. a brake member carried by the turntable for rotation therewith and having opposing horizontal parallel faces defining brake surfaces;
   f. at least one brake calliper mounted on the tractor vehicle to be restrained from movement about said vertical axis and positioned for operative engagement with said brake surfaces at all articulated positions of the trailer relative to the tractor vehicle whereby upon actuation of the brake calliper articulation of the trailer relative to the tractor vehicle is resisted;
   g. means operatively carried by the support means and the turntable for preventing axial movement of the turntable relative to the support means;
   h. a fifth wheel coupling secured to the turntable for rotation therewith;
   i. a king pin carried by the front underside of the trailer;
   j. an abutment fast with the trailer to the rear of the king pin;
   k. said fifth wheel coupling receiving said king pin and abutment so that the trailer is fast with the turntable for rotation therewith, and 1. a transverse horizontal pivot means operatively connected between the turntable and the fifth wheel coupling to permit the trailer to rise and fall relatively to the tractor vehicle when passing over a surface of varying grade.

8. The invention of claim 7 wherein said fifth wheel coupling defines a V-notch for guiding the king pin into engagement with the fifth wheel coupling and said abutment is in the form of a V-shaped wedge, the angle of the V-shaped wedge being slightly less than the angle of the V-notch whereby the trailer is allowed very limited articulation about its king pin and greater angles of articulation can only take place about the vertical axis of the turntable.

9. The invention of claim 8 wherein said V-shaped wedge is positioned for its apex to be substantially coincident with the apex of the V-notch when the king pin is in position in said fifth wheel coupling.

* * * * *